Nov. 8, 1966  J. C. HARDEN ET AL  3,283,560
DIFFERENTIAL THERMAL ANALYSIS APPARATUS
Filed Dec. 24, 1962  3 Sheets-Sheet 1

INVENTORS
JOHN C. HARDEN
DONALD A. VASSALLO
JEN CHIU
BY Norbert F. Reinert
ATTORNEY

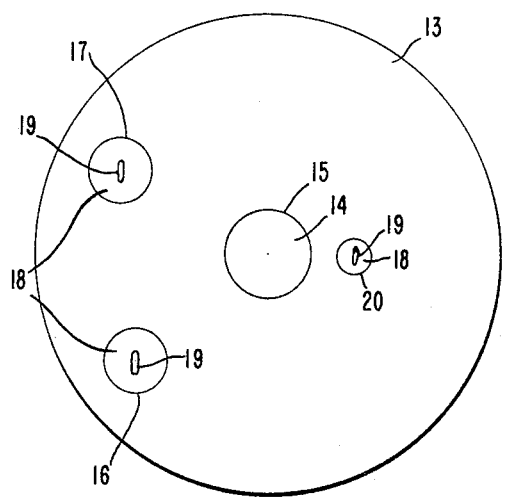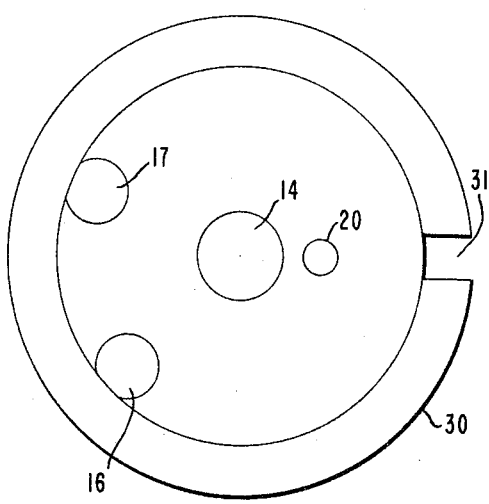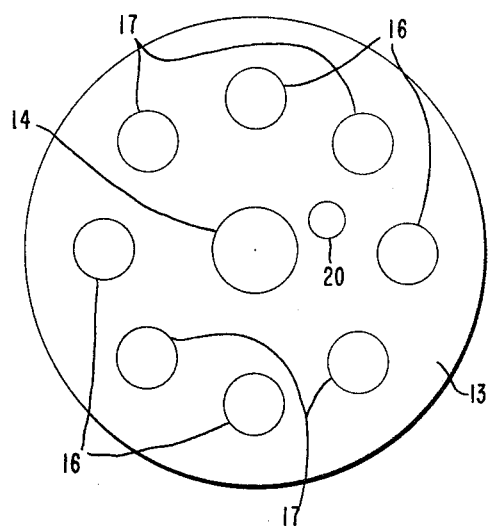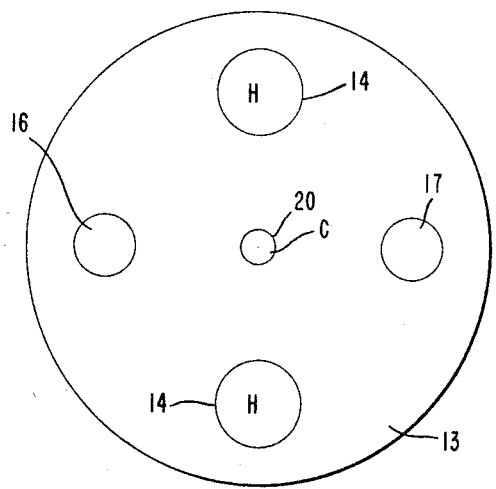

3,283,560
DIFFERENTIAL THERMAL ANALYSIS APPARATUS

John C. Harden, Wilmington, Del., Donald A. Vassallo, Orange, Tex., and Jen Chiu, Wilmington, Del., assignors to E. I. du Pont de Nemours and Company, Wilmington, Del., a corporation of Delaware
Filed Dec. 24, 1962, Ser. No. 246,692
10 Claims. (Cl. 73—15)

The present invention relates to an apparatus for conducting thermal analyses and more particularly relates to a different thermal analysis instrument which is useful in the characterization of organic and inorganic materials.

Differential thermal analysis (DTA) is an analytical method which is employed to study the thermal behavior of one or more materials during thermal environmental changes. Basically, the method requires the measurement of the temperature differential between the material which is being analyzed and a standard which does not undergo a transition within the temperature range covered, as both are being heated or cooled simultaneously at a fixed rate. This temperature differential is constant until the sample being analyzed undergoes a thermal transition which either accelerates or retards its rate of temperature change. Differential thermal analysis is utilized in the analysis of organic compounds as well as a wide variety of inorganic materials. For many analyses, however, the precision, accuracy, sensitivity, and resolution of the method as commonly employed is unsatisfactory, especially when the sample being analyzed is either a mixture of components or a single multi-transition compound wherein the thermal transitions occur at closely related temperatrues.

An object of the present invention is to provide a differential thermal analysis instrument which is useful for the analysis of organic and inorganic materials. A further object is to provide an instrument which is capable of analyzing mixtures of organic materials and/or mixtures of inorganic materials. Another object is to provide an instrument which is capable of analyzing polymeric materials, either alone or in mixtures. A further object is to provide an instrument which will permit determination of phase transitions, the heats of reaction of mixtures of materials undergoing chemical reactions and the heats of decomposition of materials being degraded. A main object of this invention is to provide a differential thermal analysis instrument capable of rendering the above-described analyses with a high degree of precision which is quite compact in size and which due to its uniqueness can provide speed and simplicity of operation with versatility.

Figure 1:
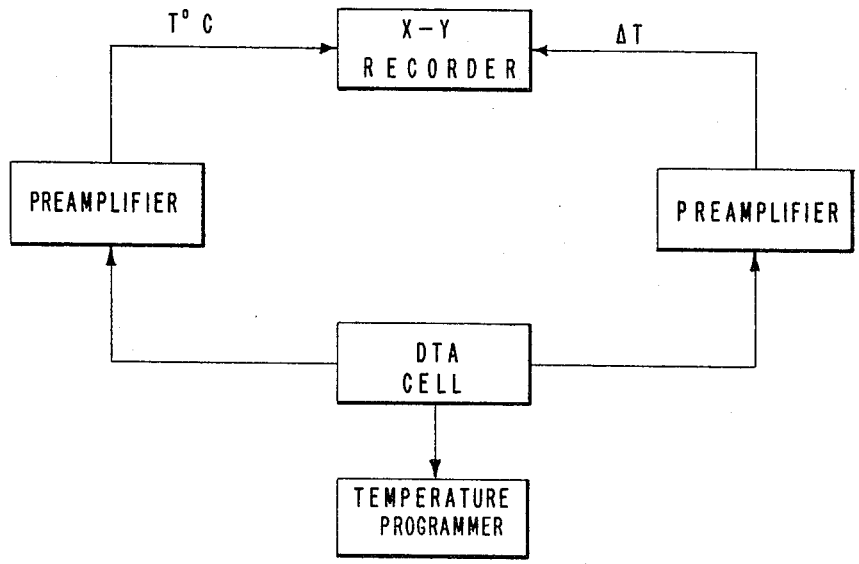

The objects of the instant invention are achieved by means of an instrument which includes an analyzer cell assembly comprising a sample block containing an internal heater, sample and reference material wells placed symmetrically about a plane passing through the axis of the heater and a well to accommodate a temperature-programming sensing means; a cell base to support said sample block; an open-ended cell enclosure which can be brought into airtight engagement with said cell base to define an enclosed space surrounding said sample block; means for cooling said sample block, and means for controlling the atmosphere in the enclosed space surrounding said sample block; electronic temperature sensing means for measurement of both the sample temperature and the differential temperature between the sample and reference material; a means of amplifying the electrical signals received from the temperature sensing means; a temperature programmer which permits heating to be carried out reproducibly and which enables heating to be integrated with the thermal transitions in the sample; a means of recording the differential temperature as a function of sample block temperature. A schematic drawing of the apparatus is shown in FIGURE 1. Although individual units are shown for the preamplifiers and the recorder, in some cases sufficient amplification can be achieved in the recorder itself, thus eliminating the necessity for including separate preamplifiers. The components of the apparatus will be discussed in detail.

Figure 2:
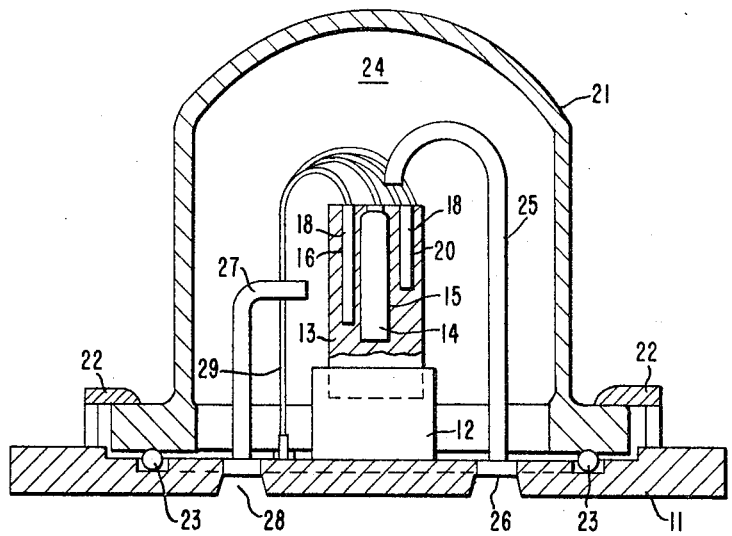

The versatility and simplicity of operation of the apparatus of the present invention is due in large part to the uniqueness of the analyzer cell assembly. The cell assembly will now be described in detail with reference to FIGURES 2 and 3 wherein FIGURE 2 represents an elevational view of the analyzer cell assembly and FIGURE 3 represents a plan view of the sample block of the cell assembly in enlarged scale. Cell assembly base plate 11 is any suitable rigid material, such as aluminum or stainless steel, having as an integral part thereof or securely fastened thereto, an insulating support 12 which may be conveniently formed of an asbestos containing or refractory material. Mounted in insulating support 12 is sample block 13. The size, shape, and material of construction of sample block 13 are important factors in the DTA apparatus because of the necessity for transferring heat to or from the sample and reference material evenly. The thermal conductivity of the material used for the cell should be such as to provide good heat transfer from block to sample or sample to block but preferably not so high that the exotherm or endotherm being sought is obscured. In general, it has been found that the thermal conductivity (in gram calories transmitted per second through a plate of the material 1 cm. thick and 1 sq. cm. in area when the temperature difference between the two sides of the plate is 1° C.) should be greater than 0.1 at 18° C. Aluminum, nickel, or stainless steel are materials which are very useful for this component.

Sample block 13 conveniently is in the shape of a cylinder having a diameter in the range of from ½" to 1½" and a length in the range of from ¾" to 2". A critical feature of sample block 13 is that it contains an internal heater 14 to provide even heating in the block and good thermal control of the sample and reference. This is conveniently accomplished by providing a well 15 in block 13 into which a cartridge-type heater is inserted, such as a 55 watt 1 x 0.375 inch heater available from Watlow, St. Louis, Mo. Referring to FIGURE 3, it is a further critical feature of block 13 that a sample well 16 and a reference material well 17, each having a diameter in the range of about 2 to 5 mm., be provided which are symmetrically arranged in reference to a plane of symmetry through the axis of heater 14. This symmetrical arrangement of wells insure an equal distribution of heat to sample and reference material during analysis. Well 16 and well 17 are each provided with a tube 18, preferably of glass, for holding the sample and reference material respectively and a temperature sensing means 19. Block 13 also contains a small diameter well 20, which preferably is located closer to heater 14 than sample well 16 and reference material well 17, which contains a tube 18, preferably of glass, containing a temperature sensing means 19 for controlling the operation of a temperature programmer.

It has been found that although it normally is undesirable to interpose an insulator between the sample and/or reference material and the sample block 13, an excellent balance between the heat transfer from block 13 to sample and from sample to block 13 is achieved in the present invention by employing tubes 18 of glass as containers for the sample and reference material. Tubes 18, however, if desired may be fabricated of metal, silica, or ceramics. The tubes preferably have a 2 to 5 mm. outer diameter and a volume of 0.01 to 1.25 ml. and, of course, wells 16 and 17 in block 13 must be of such diameter and length to accommodate these tubes. A tube 18 is also used in well 20 but the size of this tube need not be of the same size as the other tubes. Most sample cells used in the prior art are designed to accommodate ¼ gram or larger samples with the result that their size must be sufficient to overcome within-sample thermal gradients. In the present invention sample block 13 is designed to accommodate small samples of a size ranging from 0.1–10 mg. in the case of solids or 1–10 ml. in the case of liquids. In limiting the size of the sample to micro-quantities several important advantages are gained. Thermal gradients across the sample are essentially eliminated so that false peak widths due to transitions occurring in various parts of the sample at different times are eliminated. As a result, thermal transitions can be determined with a high degree of precision, accuracy, sensitivity, and resolution. As a further result thereof, mixtures of materials having transitions occurring at closely related temperatures can be analyzed. Because the sample and sample chamber are extremely minute, the thermal conductivity of the atmosphere over the sample and reference material, likewise can be neglected.

Temperature measurement may be by any of the well-known sensitive methods commonly employed to monitor thermal effects such as, for example, thermocouples, resistance thermometers, thermistors, bolometers, and the like. Because of ease of fabriction and their low cost, thermocouples are preferred as temperature sensing means 19. To minimize damping effects due to their sink-action, however, they must be as small as possible and should have a heat capacity less than 10% of the heat capacity of the sample or the reference material. For the temperature range covered herein No. 40 to No. 28 B. & S. (0.003 to 0.013" diameter) chromel-alumel, copper-constantan or platinum-platinum, rhodium thermocouples may be used.

An open-ended cell closure 21, preferably in the form of a glass belljar covers sample block 13. When the cell assembly is in operative arrangement, closure 21 is brought into airtight engagement with base plate 11 by means of clamps 22 and gasket 23 providing an enclosed space 24 surrounding block 13. The atmosphere in space 24 may be controlled as desired by evacuating the gas present therein or supplying an inert gas blanket to said space, by sources not shown, through conduit 25 mounted in opening 16 of base plate 11. When it is necessary to operate with a cooled block 13 coolant may be supplied, from a source not shown, such as the form of a liquid nitrogen spray through conduit 27 mounted in opening 28 of base plate 11. Alternate to a spray of coolant on block 13, a closed tubular coil passed through base plate 11 may be wound around block 13 through which a coolant is circulated to cool block 13. If only high temperature use is contemplated, the cooling means may be excluded altogether. Electrical conductors 29 pass through base plate 11 and lead to heater 15, and thermocouples 19 in tubes 18.

The above-described analyzer cell assembly may be integrally fastened to the basic DTA apparatus if desired by clamping and sealing the cell assembly base plate to a matching support plate on the housing for the temperature programmer and controller for the DTA instrument which contains electrical conductors and gas and coolant conduits corresponding to and registering with electrical conductors 29 and conduits 25 and 27 making integral connections therewith. The analyzer cell assembly of the invention may, if desired, also be used with an extension adapter remote from the balance of the DTA instrument in a hood, behind shielding or mounted on an analytical instrument, such as a mass spectrometer or gas chromatograph.

FIGURES 4–6 representing a plan view of sample block 13 illustrate modifications of sample block 13 described in FIGURES 2 and 3.

FIGURE 4 illustrates a visual sample block 13 which in use with glass belljar enclosure 21 offers an analyzer cell assembly that permits visual observation by the operation of the DTA instrument of melting, boiling, or degradation of the sample while the differential thermal data are being recorded. In FIGURE 4, sample block 13 contains a centrally disposed well in which is inserted internal heater 14 and a well 20 for a control thermocouple. Less than end to end longitudinal circular shaped channels 16 and 17 are disposed on the periphery of block 13 symmetrically arranged about a diametrical plane of heater 14. Block 13 fits sungly within glass sleeve 30 having an expansion gap 31. When glass tubes are used as containers for sample and reference material and inserted into channels 16 and 17 in block 13, the contents in these tubes may be visually observed through glass sleeve 30.

FIGURE 5 illustrates a sample block 13 modified for high temperature differential thermal analysis. In FIGURE 5, block 13 contains two internal heaters 14 inserted into two wells within the block. A sample well 16 and a reference material well 17 are provided in block 13 symmetrically arranged about a diametrical plane common to both heaters 14. A well 20 is centrally disposed in block 13 for containing a control thermocouple.

FIGURE 6 illustrates a multiple junction sample block 13 which may be used with a multiple contact electrical connector to provide improved signal to noise ratio over a standard sample block such as shown in FIGURE 3. In FIGURE 6, block 13 contains a centrally disposed well in which is inserted internal heater 14. Four pairs of sample wells 16 and reference material well 17 are provided in an annular belt around heater 14 with the sample well and reference material of each pair being symmetrically arranged about a diametrical plane of heater 14. A well 20 for containing a control thermocouple is provided in block 13 nearer heater 14 than sample wells 16 and reference material wells 17.

As indicated hereinabove, thermocouple circuits may be used for temperature programming, differential temperature measurement between sample and reference material and sample temperature measurement. The latter may be effected using a thermocouple, chromel-alumel or platinum-platinum, rhodium, for temperatures above 0° C., or copper-constantan, for temperatures below 0° C., which is connected in bucking series with a reference thermocouple which is kept at 0° C. or its electrical equivalent. The resultant output may be fed either directly to the X-axis of a two axis graphic or plotting recorder or to a D.C. microvolt amplifier, and then to a recorder. The graphic recorder may have a selective range of 5 microvolts to 750 millivolts and is comprised of independent, self-balancing servo mechanisms. The minimum selectivity may be increased from 5 microvolts if the signals are amplified by means of separate amplifiers rather than by using the amplification provided within the recorder. An example of an instrument which may be employed in conjunction with the aforesaid preamplifiers is a Mosely Model 4S Autograf Recorder having a selectivity range of 7.5 to 750 millivolts or a Mosely 135 Autograf Recorder. The amplifier should be a 0 to 2000 microvolt amplifier having a sensitivity of at least ±0.5% and a response time of no greater than 3 seconds. A Leeds and Northrup No. 9835–A may be used to satisfy these requirements. If it is desirable to investigate a very narrow temperature range, this can be done by expanding the X-axis by incorporating a bucking voltage in series with the signal at the input to the preamplifier. In a similar fashion the resultant signal from the differential temperature measurement circuit, wherein the sample and reference material thermocouples are coupled in bucking series after the sample thermocouple is itself coupled with 0° C. reference thermocouples or its electrical equivalent is fed, either directly or through a preamplifier, to the Y-axis of the recorder. A marked improvement in precision and accuracy is realized by utilizing the same thermocouple for both sample and differential temperature measurement. A further thermocouple circuit is utilized to control the temperature programmer and, likewise, is coupled in bucking series with a reference thermocouple or its electrical equivalent before being fed to the temperature programmer.

Figure 7:
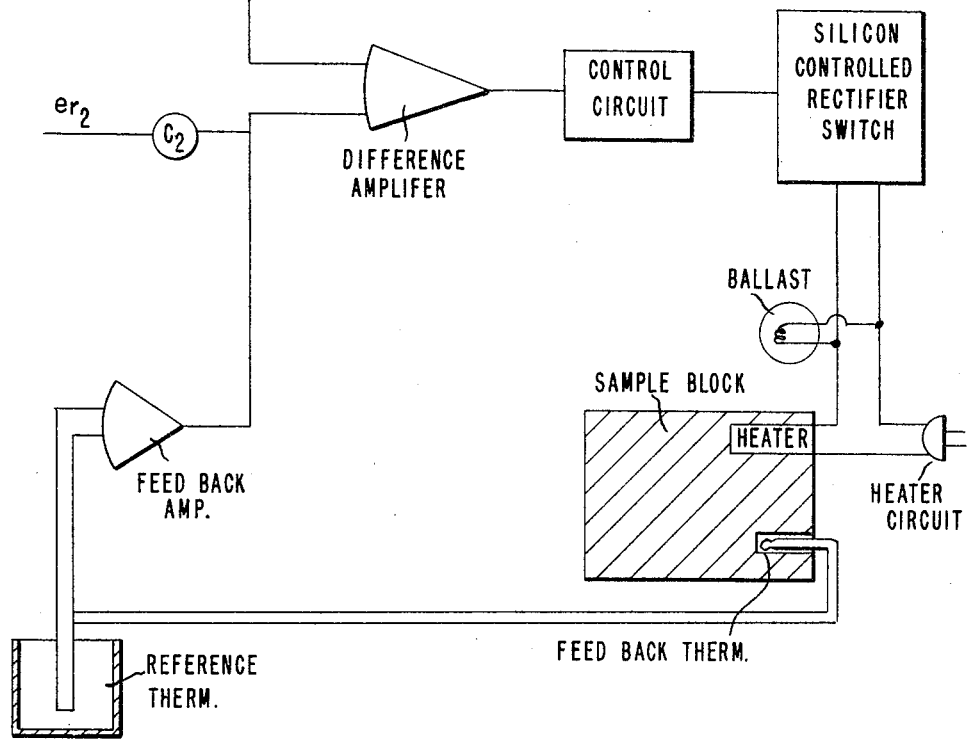

The heat source for the DTA cell is regulated by means of a temperature programmer, an integral part of the apparatus, which provides reproducible heating rates over the entire range of operation. The temperature programming control thermocouple, like the cell temperature and the differential temperature measuring thermocouples, is connected in bucking-series with a reference thermocouple. The latter is, as indicated above, placed in a cooling bath or its electrical equivalent. The resultant bucking-series output is fed directly to a programmer which provides a feedback-type control of temperature. The temperature programmer may be based on a solid state programmer which regulates the amount of electrical power to the sample block heater using a feedback loop and analog computer principle such as is exemplified by FIGURE 7. Referring to FIGURE 7, an operational amplifier-capacitor combination (integrator) is provided as a program generator. The input to the integrator is controlled to permit integration of either positive or negative input signals at a rate determined by the setting of the controller of the input voltage which permits the temperature of the heated body to be programmed upward or downward. Provision is made for grounding the input to this amplifier to hold the program at any desired constant temperature. In its normal configuration, the capacitative coupling of the operational amplifier feedback produces a liner temperature increase. Other types of couplings can be made to generate programs which are continuous single-valued functions in themselves or their first derivatives.

A feedback sensor system is provided which consists of a thermocouple pair connected in bucking opposition. One of the thermocouples is present in the sample block (well 20) and the other thermocouple is inserted in a constant temperature reference environment, such as 0° C., or alternately, a compensating voltage may be used to simulate the second thermocouple. The voltage output of these thermocouples is taken as the input to an operational amplifier which is connected as a simple voltage amplifier and the output of which is compared with the voltage generated in the integrator. The output of the feedback amplifier may be positive or negative depending on the relative temperatures of the sample block and reference thermocouples.

A difference amplifier compares the voltage outputs of the integrator and feedback amplifier plus an additional controlled voltage which determines the effective starting temperature of the program by subtracting one from the other. Therefore, the magnitude and sign of its own voltage output is a measure of the difference between the called for and actual temperatures of the sample block.

The output from the difference amplifier actuates an electronic control circuit which controls the phase output of a pair of silicon controlled rectifiers and by so doing regulates the electrical power to the furnace. The control circuit is composed of a diode bridge power supply with a unijunction transistor circuit to give peaked pulses, the position of which in the line power cycle is controlled by the input from the difference amplifier. The silicon controlled rectifier circuit functions as a rapid acting switch in the heater circuit to pass electric current for a portion of each half cycle of the rectified line voltage proportional to the difference between called for and actual temperatures of the sample block. A ballast resistance is included in the heater circuit to minimize residual current passed by the heater when the silicon controlled rectifiers in their condition of minimum flow.

Other temperature programming means may be employed, if desired, to adjust sample block temperatures. One such suitable alternate means is based on a closed loop proportional controller principal which is fully described and illustrated in co-pending application Serial No. 136,931 filed September 8, 1961, which is assigned to our assignee, now U.S. Patent No. 3,117,438.

The DTA apparatus as hereinabove described is useful for the analysis of solids and liquids. For the analysis of solids a 0.1–10 mg. sample is placed in the sample tube 18. A thermocouple is also inserted into the tube. This is done in such a manner as to obtain good thermal conduct between the sample and the thermocouple. The quantity of material in the reference compartment thereupon is adjusted to equate its heat capacity with that of the sample. To facilitate balancing, the sample may be diluted with reference material. Alternately, the thermocouple may be imbedded in a thin molten film of the sample which, after cooling, is sandwiched within the reference material. If the sample is expected to vaporize during the analysis, the reference ballast in the sample tube is essential and should be present in sufficient quantity to comprise greater than 85% of the total material in the sample tube. Liquid samples may be coated on the reference material while gaseous samples may be condensed into the sample tube and treated as liquids. In order to further improve the precision and accuracy of the analysis, the effective heat capacities of the sample and referenec materials are finally balanced by vertically positioning either the sample or reference tube within the sample block wells until the baseline reading on the graphic recorder is flat. Through use of the invention as herein described it is possible to analyze micro-samples of organic and/or inorganic materials by means of differential thermal analysis over a range of at least −240 to 1600° C., at a heating rate of 0.1 to 30° C./minute with a precision and accuracy of ±0.1° C.

The following examples are given to demonstrate but not limit the usefulness of the invention as disclosed hereinabove.

EXAMPLE 1

Using individual 2 mm. glass capillaries, cylindrical plugs are fabricated from 0.005 gram of powdered sample and from sufficient reference material to balance its heat capacity with that of the sample. Into each plug is imbedded a No. 28 B. & S. chromel-alumel thermocouple. The glass capillaries are inserted into the appropriate sample block compartments. The programmer thermocouple is inserted into a glass capillary which is placed into a third bore of the sample block while its bucking-reference thermocouple is placed in the reference environment. Heating rate is selected using the temperature program rate control and a dry blanket-gas is passed through the enclosed space surrounding the sample block. The programmer and recorder are actuated, after which the thermal profile of the sample is traced by the recorder. Using 0.0005″ to 0.005″ diameter glass beads as the reference material and a heating rate of 10° C./minute first order transitions are determined on the following materials:

| Material | Transition Temperature, ° C. (DTA) | Transition Temperature, ° C. (Literature) |
|---|---|---|
| Water | 0.5 | 0 |
| Benzene | 6 | 5.5 |
| Tristearin | 72 | 71 |
| Additional transitions | 55, 67 | 55, 65 |
| Benzoic acid | 124 | 122 |
| Ammonium nitrate | 171 | 170 |
| Additional transitions | 35, 89, 124 | 32, 85, 125 |

When measuring transitions above 400° C. a finely divided ceramic may be used as the reference material.

EXAMPLE 2

Ammonium nitrate is submitted to differential thermal analysis between room temperature and 300° C. The four endotherms occurring at 35, 89, 124 and 171° C. indicate crystalline transitions designated by X-ray diffraction as:

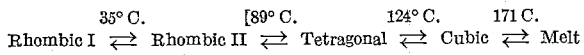

When dehydrated ammonium nitrate is used, the transitions at 35 and 89° C. disappear with a new transition appearing at 50° C. As the temperature is raised to 210° C., a sharp exotherm, indicating explosive decomposition, becomes apparent. It further is noted that, in addition to water, the transitions in ammonium nitrate are highly dependent upon other impurities as well.

EXAMPLE 3

Using as little as 3µl. in a glass capillary boiling points are determined on the following materials with the glass beads as reference, per Example 1.

| Material | Boiling Point, ° C. (DTA) | Boiling Point, ° C. (Literature) |
|---|---|---|
| Butane | 1 | −0.6 |
| Acetone | 59 | 57 |
| Benzene | 83 | 80 |
| Water | 100 | 101 |
| n-Nonane | 152 | 151 |
| n-Dodecane | 215 | 215 |
| n-Tetradecane | 255 | 253 |
| 1-n-Hexadecene | 277 | 275 |

EXAMPLE 4

Using samples as small as 1 mg., order may be detected in a polymeric material. Polyethylene terephthalate which has been melted and then cooled rapidly without mechanical stress exhibits a simple sigmoid curve indicating a second-order transition at 75° C. The same polymer, cooled rapidly from the melt under stress, as in fiber extrusion, exhibits a sharp endothermal peak at 75° C. which is a measure of the entropy change on randomization of the molecular chains.

EXAMPLE 5

When elemental sulfur is subjected to differential thermal analysis in a cell assembly and sample block which permits visual observation of the sample such as illustrated in FIGURE 4, endotherms are observed with peaks at 113°, 124°, 179°, and 446° C. The endotherm at 113° C. indicates the enantiotropic change from the α to β form of crystalline sulfur. Melting of the β form is observed during the 124° endotherm. The 179° endotherm was accompanied by a change in color of the melt from orange to red and indicates the transition associated with a rapid change in the equilibrium, $\lambda \rightleftarrows \mu \rightleftarrows \pi$, where λ, µ, and π refer to known forms of the liquid sulfur.

EXAMPLE 6

The DTA apparatus as described herein may be used for qualitative identification of materials. A reaction mixture comprising an unknown compound and a specific reagent are heated together in the DTA cell to give exo and endothermal peaks characteristic of the reaction and of the derivative product. Thus, a liquid ketone (acetone) which produces a boiling endothermal peak at 58° C. and specific reagent p-nitrophenylhydrazine, melting endotherm at 160° C., heated together give a complex thermogram revealing endo and exothermal peaks characteristic of reaction, loss of excess reactant and melting of the characteristic acetone phenylhydrazine derivative at 153° C. This corresponds well with the literature value of 152° C.

Since obviously many different embodiments of the invention may be made without departing from the spirit and scope thereof, it is to be understood that the invention is not limited by the specific illustrations presented hereinabove except to the extent defined in the following claims.

What is claimed is:

1. A differential thermal analysis apparatus comprising in combination:
   (1) an analyzer cell assembly comprising
      (a) a sample block containing therein an electrical heater and at least three wells, two of said wells being symmetrically arranged in reference to a plane of symmetry through the axis of said heater, each of said wells containing a closely fitting tube closed off at the end facing the base of the well, the volume of said tube in said symmetrically arranged wells being in a range of from 0.01–1.25 ml.; a temperature sensing means within each tube, each temperature sensing means being coupled in bucking series with a reference temperature sensing means,
      (b) a cell base for supporting said sample block,
      (c) an open-ended cell closure which can be brought into airtight engagement with said cell base defining an enclosed space surrounding said sample block,
      (d) conduit means in communication with said enclosed space through which the atmosphere within said enclosed space may be controlled,
      (e) conduit means in communication with said enclosed space through which coolant may be supplied to cool said sample block;
   (2) a temperature programmer controlling said internal electrical heater of said sample block for adjusting the temperature of said sample block;
   (3) means for amplifying the resultant signals from the sample temperature and the sample-reference differential temperature sensing means; and
   (4) means for recording the differential signal from the sample-reference temperature sensing means as a function of the signal from the sample temperature sensing means.

2. An apparatus according to claim 1 wherein said sample block is fabricated from a metal having a thermal conductivity λ of at least 0.1 at 18° C.

3. An apparatus according to claim 2 in which said sample block is cylindrical in shape having a diameter in the range of from ½–1½ inches and a length in the range of from ¾–2 inches.

4. An apparatus according to claim 1 wherein said temperature sensing means are thermocouples.

5. An apparatus according to claim 1 wherein said open-ended cell enclosure is fabricated of glass.

6. An apparatus according to claim 1 wherein said amplifying means comprises a D.C. 0–2000 microvolt amplifier having a sensitivity of at least ±0.5% and a response time of no greater than 3 seconds.

7. An apparatus according to claim 1 wherein said recording means comprises a two axis graphic recorder having a selectivity range of 5 microvolts to 750 millivolts and independent, self-balancing servo-mechanisms.

8. An apparatus according to claim 1 wherein said temperature programmer comprises a program generator consisting of an operational amplifier connected with a capacitative feedback to which voltage is supplied by a regulated D.C. supply at a rate determined by a selectable resistance to fix heating rate; a feedback sensor consisting of a thermocouple pair connected in bucking opposition, one of said thermocouples being inserted in said sample block with the other of said thermocouples being inserted in a constant temperature reference environment; a voltage amplifier to which is supplied the voltage output of said feedback sensor; a difference amplifier which compares the output of said program generator and said voltage amplifier associated with said feedback sensor; a control circuit composed of a diode bridge power supply with a unijunction transistor circuit which is actuated by the output from said difference amplifier to provide peaked gating pulses; and a silicon controlled rectifier circuit which is regulated by said control circuit to function as a rapid acting phase control switch to pass current to said internal electrical heater.

9. An analyzer cell assembly for use in a differential thermal analysis apparatus comprising
  (1) a sample block containing therein an electrical heater and at least three wells, two of said wells being symmetrically arranged in reference to a plane of symmetry through the axis of said heater, each of said wells containing a closely fitting tube closed off at the end facing the base of the well, the volume of said tube in said symmetrically arranged wells being in a range of from 0.01–1.25 ml.; a temperature sensing means within each tube, each temperature sensing means being coupled in bucking series with a reference temperature sensing means,
  (2) a cell base for supporting said sample block,
  (3) an open-ended cell closure which can be brought into airtight engagement with said cell base defining an enclosed space surrounding said sample block,
  (4) conduit means in communication with said enclosed space through which the atmosphere within said enclosed space may be controlled,
  (5) conduit means in communication with said enclosed space through which coolant may be supplied to cool said sample block.

10. An analyzer cell assembly for use in a differential thermal analysis apparatus comprising
  (1) a cylindrically shaped sample block having a diameter in the range of from ½–1½ inches and a length in the range of from ¾–2 inches fabricated from a metal having a thermal conductivity λ of at least 0.1 at 18° C.; said sample block containing therein an electrical heater and at least three wells, two of said wells being symmetrically arranged about a diametrical plane of said heater, the axis of said symmetrically arranged wells being somewhat less than the radial distance of the wells from the periphery of said sample block whereby one side of said well is exposed to view; each of said wells containing a closely fitting glass tube closed off at the end facing the base of the well, the volume of said tubes in said symmetrically arranged wells being in the range of from 0.01–1.25 ml.; a temperature sensing means within each tube; each temperature sensing means being coupled in bucking series with a reference temperature sensing means;
  (2) a transparent sleeve fitting snugly around said sample block;
  (3) a cell base for supporting said sample block;
  (4) an open-ended cell closure fabricated of transparent material which can be brought into airtight engagement with said cell base defining an enclosed space surrounding said sample block;
  (5) conduit means passing through said cell base in communication with said enclosed space through which the atmosphere within said enclosed space may be controlled; and
  (6) conduit means passing through said cell base in communication with said enclosed space through which coolant may be supplied to cool said sample block.

References Cited by the Examiner

Ayres, W. M. et al.: "Differential Thermal Studies with Simultaneous Gas Evolution Profiles." In Analytical Chemistry. Pages 568–572, April 1961.

Pakulak, J. M. et al.: "Thermistorized Apparatus for DTA." In Analytical Chemistry. Pages 1037–1039, June 1959.

RICHARD C. QUEISSER, *Primary Examiner.*

JACK C. GOLDSTEIN, *Assistant Examiner.*